May 20, 1924.
J. FLINNER
1,494,350
DEVICE FOR TESTING AIR BRAKE HOSE
Filed Jan. 17, 1923
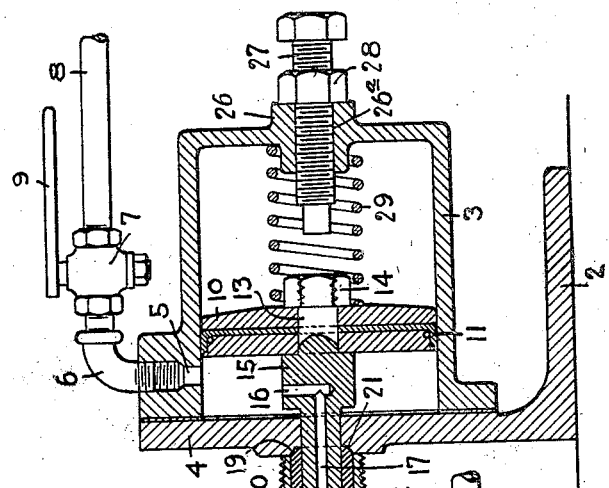
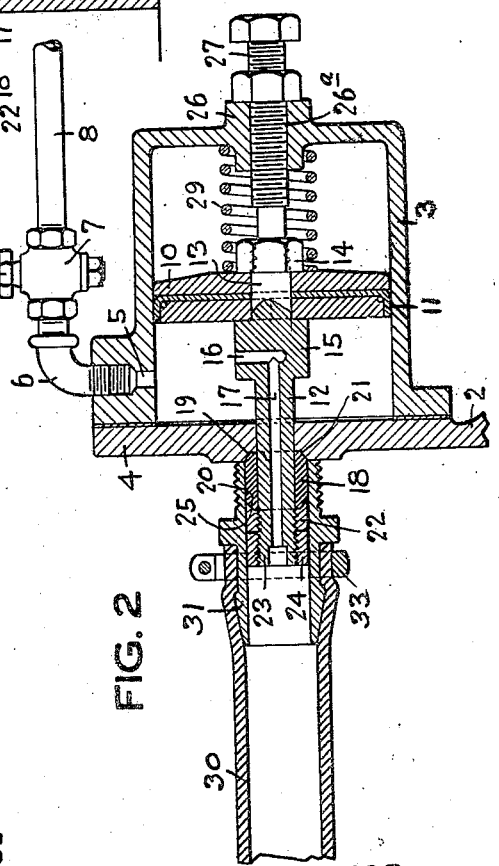
INVENTOR
John Flinner Patented May 20, 1924.

1,494,350

UNITED STATES PATENT OFFICE.

JOHN FLINNER, OF BROWNSVILLE, PENNSYLVANIA, ASSIGNOR OF ONE-THIRD TO ROBERT M. LONG AND ONE-THIRD TO NELSON T. CLINE, BOTH OF PITTSBURGH, PENNSYLVANIA.

DEVICE FOR TESTING AIR-BRAKE HOSE.

Application filed January 17, 1923. Serial No. 613,128.

*To all whom it may concern:*

Be it known that I, JOHN FLINNER, a citizen of the United States, and resident of Brownsville, in the county of Fayette and State of Pennsylvania, have invented a new and useful Improvement in Devices for Testing Air-Brake Hose; and I do hereby declare the following to be a full, clear, and exact description thereof.

My invention relates to a device for testing air-brake hose, or hose for any other purpose, where the hose has to be subjected to a certain pressure before it can be put into use.

The object of my invention is to provide a device of this character which is simple in construction, and by the use of which the hose may be quickly adjusted in position, tested and automatically released from the testing device, thereby making it possible to greatly expedite and reduce the cost of such testing over the old methods ordinarily heretofore employed.

In the accompanying drawing, Fig. 1 is a longitudinal sectional view of my improved testing device, showing the hose applied for testing; and Fig. 2 is a like view showing the device during the testing operation.

In the drawing the numeral 2 designates a suitable base or frame which supports the cylinder 3 and which may be bolted or otherwise secured to the upright plate 4 of said frame, said plate forming the front cylinder-head.

The cylinder 3 has the inlet port 5 to which the elbow 6 is connected, said elbow being connected up to the three-way valve 7 to which the air-supply pipe 8 is secured. A handle 9 is provided for operating said valve to direct the air into the cylinder 3, or to permit the air to escape from the cylinder to the atmosphere.

Within the cylinder 3 is a suitable piston 10 which is provided with the packing-ring 11. The piston-rod 12 is connected to the piston 10, said rod having the neck-portion 13 which passes through an opening in said piston, and a nut 14 is screwed on to said neck-portion projecting beyond said piston.

The piston 12 is provided with the enlargement 15 which has the port 16 formed therein which connects with the port or passage 17 extending through the piston 12.

Surrounding the piston 12 is the rubber or like flexible sleeve 18, said coupling having the inner and outer beveled ends 19 and 20, respectively. The inner beveled end 19 of the sleeve 18 fits in a recess 21 formed in the plate 4 of the frame, and the opposite beveled portion 20 of said sleeve is engaged by the collar 22 which engages the threaded portion 23 of the piston locked in position by the lock nut 24 and the inner end of said collar is beveled, as at 25, to correspond to the beveled end-portion 20. In this manner the sleeve 18 is held between the plate 4 of the frame and said collar 22.

The cylinder 3 is provided with the hub 26, said hub having the opening 26ª through which the adjusting-screw 27 passes, said adjusting-screw being held in place by the jam-nut 28. A spring 29 surrounds the inner portion of the hub 25, and said spring is interposed between the outer end of the cylinder and the piston 10. The adjusting screw 27 forms a stop to control the movement of the piston.

In the testing of an air-brake hose, the hose 30 is provided with the nipple 31 and the coupling 32, all of ordinary construction, the nipple being held in place by the clamp 33. The nipple is slipped on to the piston 12 of the testing device and passes over and around the rubber sleeve 18, as clearly shown in Fig. 1. The coupling 32 is connected up to a dummy coupling 34 which may be provided with a suitable gauge (not shown), but which forms no part of my present invention.

The air from the air-pipe 8 is permitted to enter the front end of the cylinder through the elbow 6 by turning the valve-handle 9, and the air on entering said cylinder will pass by the ports 16 and 17 into the hose, and at the same time the pressure acting on the piston 10 will cause said piston to yield, thereby compressing the spring 29, as clearly indicated in Fig. 2. At the same time that the piston 10 recedes the piston-rod 12 moves in the same direction and the collar 22 will compress the rubber-sleeve 18, thereby forcing said rubber out against the inner walls of the nipple 31 so as to prevent the escape of the air. When the hose has been subjected to the proper pressure, which will be indicated by the gauge, the valve-handle 9 is moved to shut off the air-pressure and vent the cylinder to the atmosphere, whereupon the air will escape and the piston will be advanced by the action of the spring 29 in expanding. By the return of the piston under the action of the spring, the piston-rod will be advanced quickly and the elongation of the sleeve 18 will act to strip the nipple 31 from the piston, whereupon the device is ready for the next hose to be tested which is quickly adjusted in position as above, and the testing operation repeated. In this manner the hose may be tested in quick succession as the movement of the piston packs the joint where the nipple is connected, so that there is no escape of the air, and the full pressure is obtained immediately, while the release of the air automatically strips the nipple from the piston so that a great deal of time and labor is saved.

What I claim is:

1. In a device for testing hose, the combination of a cylinder, a piston in said cylinder, a spring engaging the rear face of said piston, means for admitting fluid to the front end of said cylinder, a piston-rod connected to said piston having a fluid passage, and packing on said piston rod interposed between the cylinder head and an abutment on said piston-rod.

2. In a device for testing hose, the combination of a cylinder, a piston therein, a spring interposed between said piston and the cylinder head, means for controlling the inward movement of said piston, means for admitting fluid to the front end of said cylinder, a piston-rod connected to said piston having a fluid passage, packing surrounding said piston-rod, and means for compressing said packing by the inward movement of said piston.

3. In a device for testing hose, the combination of a cylinder, a piston therein, a spring interposed between said piston and the cylinder head, an adjusting screw passing through said cylinder head, means for admitting fluid to the front end of said cylinder, a piston rod connected to said piston having a fluid passage, packing surrounding said piston-rod, and means for compressing said packing by the inward movement of said piston.

In testimony whereof I, the said JOHN FLINNER, have hereunto set my hand.

JOHN FLINNER.